US012644704B2

(12) United States Patent (10) Patent No.: US 12,644,704 B2

Thomas (45) Date of Patent: *Jun. 2, 2026

(54) HANDS FREE LEVEL

(71) Applicant: Marvin Thomas, St. Louis, MO (US)

(72) Inventor: Marvin Thomas, St. Louis, MO (US)

( * ) Notice: Subject to any disclaimer, the term of this patent is extended or adjusted under 35 U.S.C. 154(b) by 373 days.

This patent is subject to a terminal disclaimer.

(21) Appl. No.: 18/369,324

(22) Filed: Sep. 18, 2023

(65) Prior Publication Data

US 2024/0003682 A1 Jan. 4, 2024

Related U.S. Application Data

(63) Continuation-in-part of application No. 17/718,469, filed on Apr. 12, 2022, now Pat. No. 11,761,761.

(60) Provisional application No. 63/174,755, filed on Apr. 14, 2021.

(51) Int. Cl.
G01C 15/00 (2006.01)
F16M 13/02 (2006.01)

(52) U.S. Cl.
CPC ......... G01C 15/004 (2013.01); F16M 13/022 (2013.01)

(58) Field of Classification Search
CPC ............................ F16M 13/002; G01C 15/004
USPC .......... 33/263, 281, 286, 347, 371, 372, 373
See application file for complete search history.

(56) References Cited

U.S. PATENT DOCUMENTS

| | | | | |
|---|---|---|---|---|
| 5,402,579 A * | 4/1995 | Smith | ..................... | B25B 5/101 |
| | | | | 33/354 |
| 5,505,001 A * | 4/1996 | Schaver, Jr. | ............. | H02G 1/00 |
| | | | | 33/354 |
| 6,202,312 B1 * | 3/2001 | Rando | .................. | G01C 15/004 |
| | | | | 356/138 |
| 6,389,709 B1 * | 5/2002 | Lunde | ..................... | G01C 5/00 |
| | | | | 33/768 |
| 6,430,823 B1 * | 8/2002 | Seki | ..................... | G01C 15/004 |
| | | | | 33/286 |
| 6,792,685 B1 * | 9/2004 | Ng | .......................... | G01C 15/10 |
| | | | | 33/286 |
| 7,031,367 B2 * | 4/2006 | Marshall | ............. | G01C 15/004 |
| | | | | 33/290 |
| 7,137,207 B2 * | 11/2006 | Armstrong | ........... | G01C 15/004 |
| | | | | 33/286 |
| 9,234,751 B2 | 1/2016 | Silberberg | | |
| 9,389,074 B2 * | 7/2016 | Esposito | ................... | F16B 2/12 |
| 9,651,372 B1 | 5/2017 | Lopez et al. | | |
| 10,119,817 B2 * | 11/2018 | Spaulding | ............ | G01C 15/002 |
| 10,969,223 B2 * | 4/2021 | Miller | .................. | G01C 15/008 |
| 11,125,877 B2 * | 9/2021 | McGill | ................ | G01C 15/008 |
| 11,320,264 B2 * | 5/2022 | Melton | ................ | G01C 15/105 |
| 11,453,038 B2 * | 9/2022 | Sullivan | .................. | B21D 7/14 |
| 11,761,761 B2 * | 9/2023 | Thomas | ................... | G01C 9/34 |
| | | | | 33/371 |

(Continued)

FOREIGN PATENT DOCUMENTS

GB          2433431 A  *  6/2007   ............. F16M 11/06

*Primary Examiner* — George B Bennett

(74) *Attorney, Agent, or Firm* — David H. Chervitz

(57) ABSTRACT

A hands free level has a body having a first end and a hook shaped end, the hook shaped end having a first laser device positioned in a horizontal orientation and a second laser device positioned in a vertical orientation, the body having a set screw opening, and a set screw for insertion into the set screw opening.

20 Claims, 8 Drawing Sheets

(56)          References Cited

U.S. PATENT DOCUMENTS

| | | | |
|---|---|---|---|
| 2005/0198845 A1* | 9/2005 | Robinson ............. | G01C 15/004 |
| | | | 33/227 |
| 2006/0265891 A1 | 11/2006 | Murphy | |
| 2006/0283029 A1* | 12/2006 | Jan ........................ | G01C 15/002 |
| | | | 33/286 |
| 2007/0180720 A1* | 8/2007 | Gorgone .................. | G01C 9/02 |
| | | | 33/382 |
| 2015/0292886 A1* | 10/2015 | Bascom ............... | G01C 15/002 |
| | | | 33/291 |
| 2019/0063921 A1* | 2/2019 | George ................ | G01C 15/002 |
| 2022/0170743 A1* | 6/2022 | Gould ................. | G01C 15/004 |

* cited by examiner

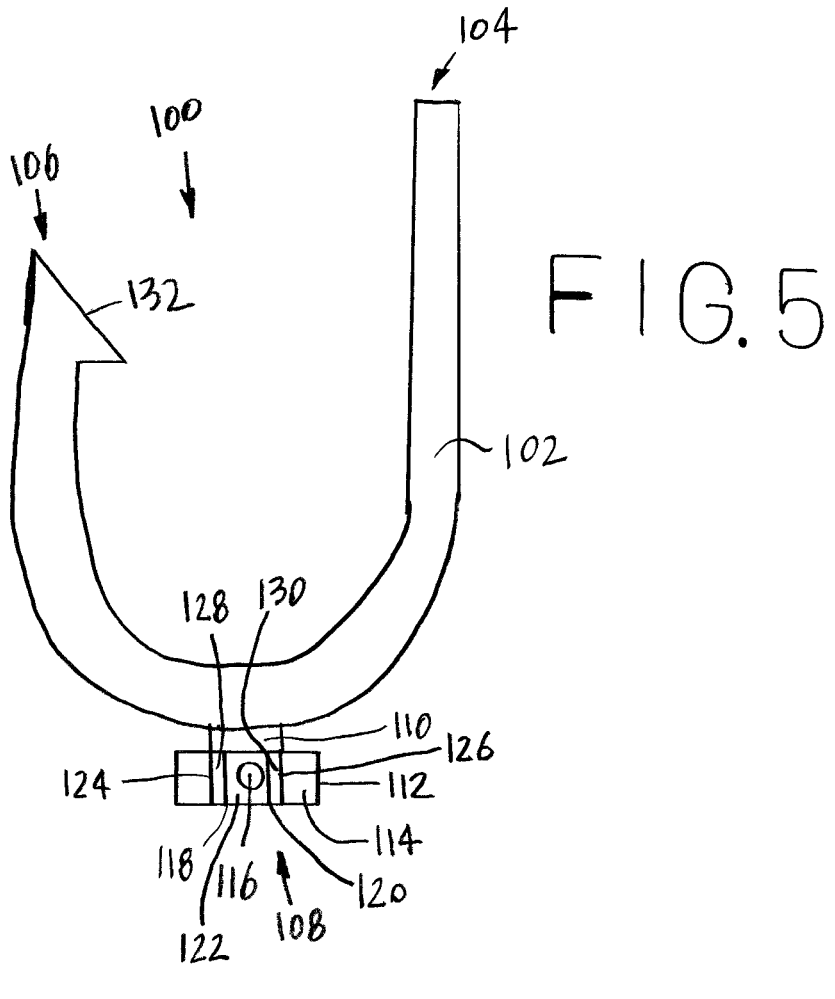
F I G.5
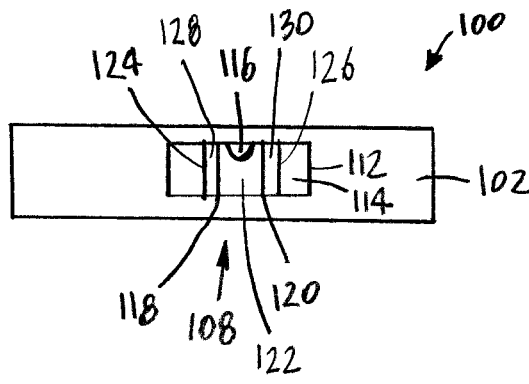
F I G.6

HANDS FREE LEVEL

RELATED APPLICATION

This application is a continuation-in-part of U.S. patent application Ser. No. 17/718,469, filed on Apr. 12, 2022, which is now U.S. Pat. No. 11,761,761, which claimed priority to U.S. Provisional Patent Application No. 63/174, 755, filed on Apr. 14, 2021, the disclosures of which are incorporated herein by reference.

BACKGROUND

This disclosure relates generally to a device for leveling a pipe or a stud, and more particularly to a hands free level for leveling a pipe or a stud.

Pipes for plumbing for directed liquids or waste liquids are found in most living structures. During installation of the pipes the pipes need to be level or positioned on a grade to insure that waste liquids drain properly. Typically when leveling such pipes the plumber holds a level device or a torpedo level against the pipe to determine if it is level. However, if the pipe is not level then the plumber must put down the level device and reposition the pipe. The level device must then be placed against the pipe to determine if the leveling effort has been successful. As can be appreciated, this continuous checking, repositioning, and rechecking for level is tedious, time consuming, and reduces productivity. In an attempt to make this process easier for a plumber various devices have been developed. One device is a laser level device in which a laser pointer is projected to identify a level line. However, these devices are expensive, require power, experience on how to properly use them, and may not fit into an area in which pipes need to be leveled. Some other devices which have been proposed use magnets to magnetically attach a level to a metal pipe. However, if the pipe to be leveled is not magnetic then the leveling device is not helpful. Also, another suggested device uses an adhesive to attach the level to a pipe. Again, although such a device may be used, if the level needs to be positioned on another section of the pipe then the device must be removed which may be problematic since the level has been glued to the pipe. In essence, such a device is not easily moved along the pipe to check level along various sections of the pipe.

Studs, such as wooden or metal studs, are used in constructing structures such as houses or buildings. During installation the studs need to be level to insure that anything attached to the stud will be level. Typically when leveling a stud a carpenter holds a level device or a torpedo level against the stud to determine if it is level. However, if the stud is not level then the carpenter must put down the level device and reposition the stud. The level device must then be placed against the stud to determine if the leveling effort has been successful. As with the plumber checking for level of a pipe, this continuous checking, repositioning, and rechecking for level is tedious, time consuming, and reduces productivity. In an attempt to make this process easier for a carpenter various devices have been developed. One device is a laser level device in which a laser pointer is projected to identify a level line. However, these devices are expensive, require power, experience on how to properly use them, and may not fit into an area in which studs need to be leveled. Some other devices which have been proposed use magnets to magnetically attach a level to a metal stud. However, if the pipe to be leveled is not magnetic then this particular leveling device is not helpful.

The present disclosure is designed to obviate and overcome many of the disadvantages and shortcomings experienced with prior leveling devices. Moreover, the present disclosure is related to a hands free level that can be attached to a pipe or a stud to determine the level of the pipe or the stud. The hands free level of the present disclosure can also be easily removed from the pipe or the stud after the level of the pipe or the stud has been established or may be moved along the pipe or the stud to easily check level at various positions along the pipe or the stud. The hands free level of the present disclosure is also simple to install and use. Also, the hands free level of the present disclosure does not require any tools to install or remove the hands free level.

SUMMARY

In one form of the present disclosure, a hands free level is disclosed which comprises a body having a first end and a hook shaped end, the hook end having a first laser device positioned in a horizontal orientation and a second laser device positioned in a vertical orientation, the body having a set screw opening, and a set screw for insertion into the set screw opening.

In another form of the present disclosure, a hands free level comprises a generally J-shaped body having a first end and a hook shaped end, the hook shaped end having a first laser device positioned in a horizontal orientation and a second laser device positioned in a vertical orientation, the body having a set screw opening extending through the body, and a set screw for insertion into the set screw opening.

In still another form of the present disclosure, a hands free level comprises a body having a first end and a hook shaped end, the hook end having a laser device, the body having a set screw opening extending through the body, and a set screw for insertion into the set screw opening.

In light of the foregoing comments, it will be recognized that the hands free level of the present disclosure is of simple construction and design and which can be easily employed with highly reliable results.

The present disclosure provides a hands free level that can be easily installed on a pipe or a stud without using any tools.

The present disclosure provides a hands free level that is easy to use and install on a pipe or a stud and does not interfere with the use of the pipe or the stud.

The present disclosure provides a hands free level that is lightweight, strong, compact, and durable and is capable of leveling a pipe or a stud quickly and accurately.

The present disclosure also provides a hands free level that can be constructed using readily available materials.

The present disclosure is directed to a hands free level that can be attached to a pipe or a stud and is easily removed from the pipe or the stud once the pipe or the stud has been leveled.

The present disclosure also provides a hands free level that can be attached to a pipe or a stud anywhere along the length of the pipe or the stud to determine the level of the pipe or the stud.

The present disclosure is also directed to a hands free level that does not require any specialized skill to be able to install or remove the hands free level from a pipe or a stud.

The present disclosure provides a hands free level that may be attached to pipes having different diameters.

The present disclosure provides a hands free level that may be attached to studs having different thicknesses or widths.

The present disclosure is further directed to a hands free level that is constructed of a material that is resistant to mold and mildew.

The present disclosure also provides a hands free level may be used on an existing pipe to determine the level or the grade of the pipe.

The present disclosure is also directed to a hands free level that may be positioned on an existing stud to determine the level of the existing stud.

The present disclosure is directed to a hands free level that may be positioned on a horizontal pipe or a vertical pipe.

The present disclosure is further directed to a hands free level that may be positioned on a vertical stud or a horizontal stud such as a beam.

The present disclosure relates to a hands free level that may be positioned on a pipe and may be easily moved along the pipe to check for level at various positions along the pipe.

The present disclosure also relates to a hands free level that has a level device that may be positioned on a stud and may be easily moved along the stud to check for level at various positions along the stud.

The present disclosure is directed to a hands free level that has a laser device that projects a laser beam for determining a level along an area.

These and other advantages of the present disclosure will become apparent after considering the following detailed specification in conjunction with the accompanying drawings, wherein:

BRIEF DESCRIPTION OF THE DRAWINGS

FIG. 5 is a top view of another embodiment of a hands free level constructed according to the present disclosure;

FIG. 6 is a front view of the hands free level shown in FIG. 5 for use on a vertical orientated pipe;

DETAILED DESCRIPTION OF A PREFERRED EMBODIMENT

Figures 1, 2:
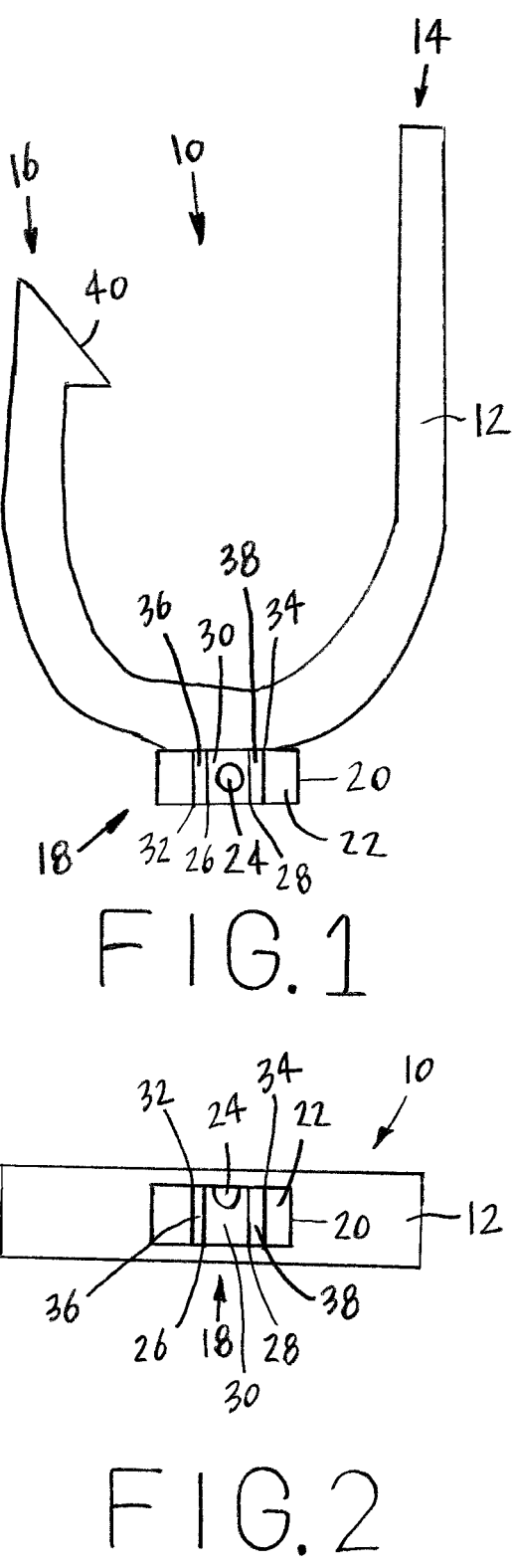
FIG. 1 is a top view of a hands free level constructed according to the present disclosure.
FIG. 2 is a front view of the hands free level shown in FIG. 1 constructed according to the present disclosure.

Referring now to the drawings, wherein like numbers refer to like items, number 10 identifies a preferred embodiment of a hands free level constructed according to the present disclosure. Referring now to FIG. 1, the hands free level 10 is shown comprising a body 12 having a first end 14 and a second hook shaped end 16, and a level device 18. The level device 18 is a bubble type level having a tube 20 partially filled with a liquid 22 that has a bubble 24 that indicates whether an item (not show) is level. The tube 20 may also have a first left end marking 26 and a first right end marking 28 to indicate a center portion 30 in which the bubble 24 is positioned to indicate level. The tube 20 may also have a second left end marking 32 and a second right end marking 34. The first left end marking 26 and the second left end marking 32 define a left tilting portion 36 in which the bubble 24 is positioned to indicate a grade of a pipe to the left. The first right end marking 28 and the second right end marking 34 define a right tilting portion 38 in which the bubble 24 is positioned to indicate a grade of a pipe to the right. By way of example only, the left tilting grade or the right titling grade may be five degrees. The level device 18 is orientated parallel with the body 12 for the device 10 to level a vertical pipe. The body 12 is generally U-shaped, J-shaped, or horseshoe shaped. The first leg 14 may also be longer than the second leg 16. The second hook shaped end 16 has a hook or barb 40 that is used to engage a pipe (not shown) to hold the body 12 in a tension against the pipe. In this manner, the device 10 may be moved along the pipe to check for level at various positions along the pipe. As indicated, the hands free level 10 is preferably used on a vertical pipe. The body 12 may be constructed of any suitable plastic. The device 10 may also being manufactured or constructed of a material that is resistant to mold and mildew or may be coated with a coating that is resistant to mold and mildew.

FIG. 2 illustrates a front view of the hands free level 10. The hands free level 10 has the body 12 and the level device 18. The level device 18 has the tube 20 partially filled with the liquid 22 that has the bubble 24 that indicates whether an item, such as a pipe, is level. The tube 20 also have the first left end marking 26 and the first right end marking 28 to indicate the center portion 30 in which the bubble 24 is positioned to indicate level. The tube 20 further have the second left end marking 32 and the second right end marking 34. The first left end marking 26 and the second left end marking 32 define the left titling portion 36. The first right end marking 28 and the second right end marking 34 define the right titling portion 38.

Figure 3:
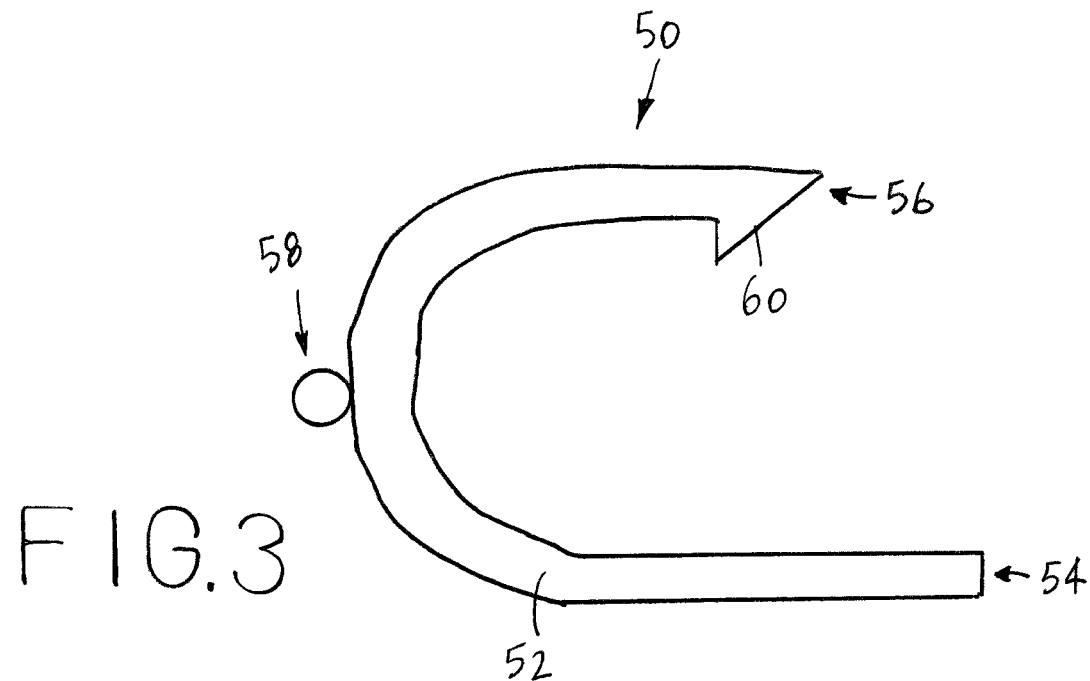
FIG. 3 is a top view of another embodiment of a hands free level constructed according to the present disclosure.

With reference now to FIG. 3, another embodiment of a hands free level 50 constructed according to the present disclosure is depicted. The hands free level 50 comprises a body 52 having a first end 54 and a second hook shaped end 56, and a level device 58. The body 52 is generally U-shaped, J-shaped, or horseshoe shaped. The second hook shaped end 56 has a hook or barb 60 that is used to engage a pipe (not shown) to hold the body 52 in a tension against the pipe. In this manner, the device 50 may be moved along the pipe to check for level at various positions along the pipe. The hands free level 50 is preferably used on a horizontal pipe. The body 52 may be constructed of any suitable plastic. The device 50 may also being manufactured or constructed of a material that is resistant to mold and mildew or may be coated with a coating that is resistant to mold and mildew.

Figure 4:
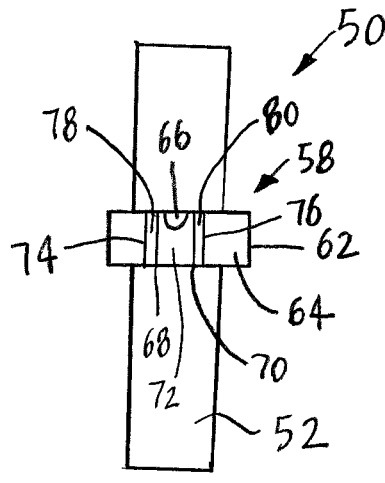
FIG. 4 is a front view of the hands free level shown in FIG. 4.

FIG. 4 illustrates a front view of the hands free level 50. The hands free level 50 comprises the body 52 and the level device 58. The level device 58 is a bubble type level having a tube 62 partially filled with a liquid 64 that has a bubble 66 that indicates whether an item (not show) is level. The tube 62 may also have a first left end marking 68 and a first right end marking 70 to indicate or define a center portion 72 in which the bubble 66 is positioned to indicate level. The tube 62 may also have a second left end marking 74 and a second right end marking 76. The first left end marking 68 and the second left end marking 74 define an incline portion 78 in which the bubble 66 is positioned to indicate an incline grade of a pipe. The first right end marking 70 and the second right end marking 76 define a decline portion 80 in which the bubble 66 is positioned to indicate a decline grade of a pipe. By way of example only, the incline grade or the decline grade may be five degrees. The level device 58 is orientated perpendicular with the body 52 for the device 50 to level a horizontal pipe.

With particular reference now to FIG. 5, another embodiment of a hands free level 100 is shown. The hands free level 100 comprises a body 102 having a first end 104 and a second hook shaped end 106, a level device 108, and a rotation device 110 for connecting the level device 108 to the body 102. The rotation device 110 allows the level device 108 to be rotated or pivoted relative to the body 102 to orientate the in a position parallel to the body 102 or perpendicular to the body 102. The rotation device 110 may be a ratcheting type device. The level device 108 is a bubble type level having a tube 112 partially filled with a liquid 114 that has a bubble 116 that indicates whether an item (not show) is level. The tube 112 may also have a first left end marking 118 and a first right end marking 120 to indicate a center portion 122 in which the bubble 116 is positioned to indicate level. The tube 112 may also have a second left end marking 124 and a second right end marking 126. The first left end marking 118 and the second left end marking 124 define a first grade portion 128 in which the bubble 116 is positioned to indicate a grade or an incline of a pipe. The first right end marking 120 and the second right end marking 126 define a second grade portion 130 in which the bubble 116 is positioned to indicate a grade or a decline of a pipe. By way of example only, the first grade or the second grade may be five degrees. The level device 108 is shown being orientated parallel with the body 102 for the device 100 to level a vertical pipe. However, as will be discussed in detail further herein, the rotation device 110 allows the level device 108 to be rotated or pivoted so that the device 100 can be used on a horizontal pipe. The body 102 is generally U-shaped, J-shaped, or horseshoe shaped. The first leg 104 may also be longer than the second leg 106. The second hook shaped end 106 has a hook or barb 132 that is used to engage a pipe (not shown) to hold the body 102 in a tension against the pipe. In this manner, the device 100 may be moved along the pipe to check for level at various positions along the pipe. As indicated, the hands free level 100 may be used on a vertical pipe or a horizontal pipe. The body 102 may be constructed of any suitable plastic. The device 100 may also being manufactured or constructed of a material that is resistant to mold and mildew or may be coated with a coating that is resistant to mold and mildew.

FIG. 6 illustrates the level device 108 being orientated in a position that is parallel with the body 102. The level device 108 has the tube 112 partially filled with the liquid 114 that has the bubble 116 that indicates whether an item, such as a pipe, is level. The tube 112 also have the first left end marking 118 and the first right end marking 120 to indicate or define the center portion 122 in which the bubble 116 is positioned to indicate level. The tube 112 further have the second left end marking 124 and the second right end marking 126. The first left end marking 118 and the second left end marking 124 define the portion 128. The first right end marking 120 and the second right end marking 126 define the portion 130. In this position the device 100 may be used to level a pipe in the vertical orientation.

Figure 7:
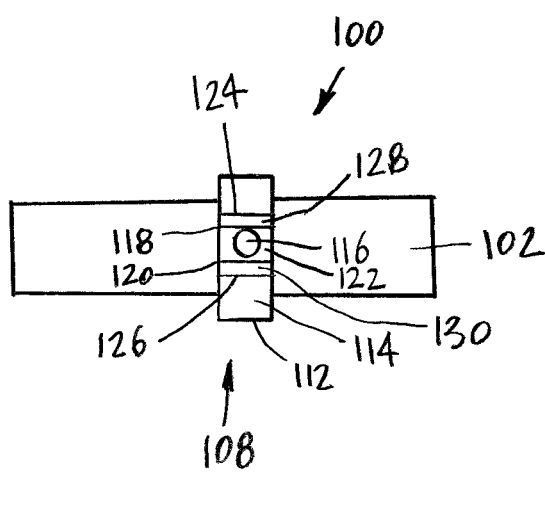
FIG. 7 is another front view of the hands free level shown in FIG. 5 for use on a horizontal orientated pipe.

Referring now to FIG. 7, the level device 108 is shown being orientated in a position that is perpendicular to the body 102. The level device 108 has the tube 112 partially filled with the liquid 114 that has the bubble 116 that indicates whether an item, such as a pipe, is level. The tube 112 also have the first left end marking 118 and the first right end marking 120 to indicate or define the center portion 122 in which the bubble 116 is positioned to indicate level. The tube 112 further have the second left end marking 124 and the second right end marking 126. The first left end marking 118 and the second left end marking 124 define the portion 128. The first right end marking 120 and the second right end marking 126 define the portion 130. In this position the device 100 may be used to level a pipe in the horizontal orientation. As can be appreciated, by use of the rotation device 110, the level device 108 may be moved back and forth depending upon the orientation of a pipe to be leveled.

Figure 8:
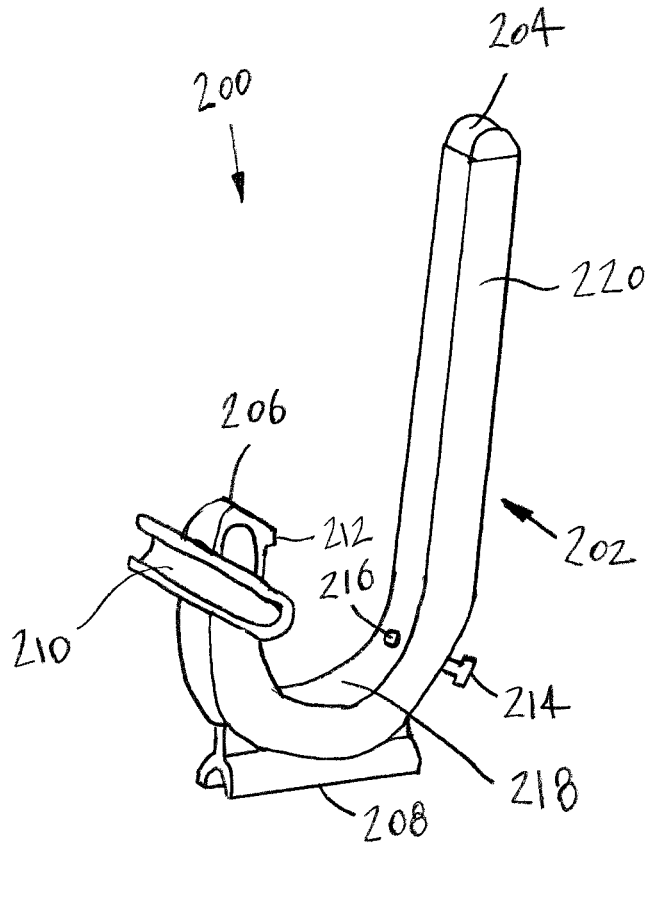
FIG. 8 is a perspective view of another embodiment of a hands free level constructed according to the present disclosure.

FIG. 8 shows another embodiment of a hands free level 200 constructed according to the present disclosure. The hands free level 200 comprises a generally J-shaped body 202 having a first end 204 and a hook shaped end 206. The hook end 206 has a first or horizontal receptacle 208 and a second or vertical receptacle 210. The receptacles 208 and 210 are each adapted for receiving a bubble level (not shown) such as the level device 18 shown in FIG. 1. The hook end 206 has a hook or barb 212 that is used to engage a pipe (not shown) to hold the body 202 in a tension against the pipe. In this manner, the device 200 may be moved along the pipe to check for level at various positions along the pipe. As can be appreciated, the hands free level 200 may be employed on both a vertical pipe and a horizontal pipe. The device 200 may be constructed of any suitable plastic. The device 200 may also being manufactured or constructed of a material that is resistant to mold and mildew or may be coated with a coating that is resistant to mold and mildew. The body 202 also has a set screw 214 and a set screw opening 216 formed in the body 202 and extends through the body 202. The set screw 214 is inserted into the set screw opening 216 and is capable of extending out of the body 202 to hold the device 200 to a pipe. Unscrewing or loosening the set screw 214 will free the device 200 from the pipe and allow the device 200 to be reposition along the pipe. The device 200 also has a rounded section 218 which is capable of fitting around a pipe. The device 200 further has a grasping section 220. The grasping section 220 extends out from a pipe and allows the device 200 to be easily grasped to move the device 200 along the pipe or to remove the device 200 from the pipe.

Figure 9:
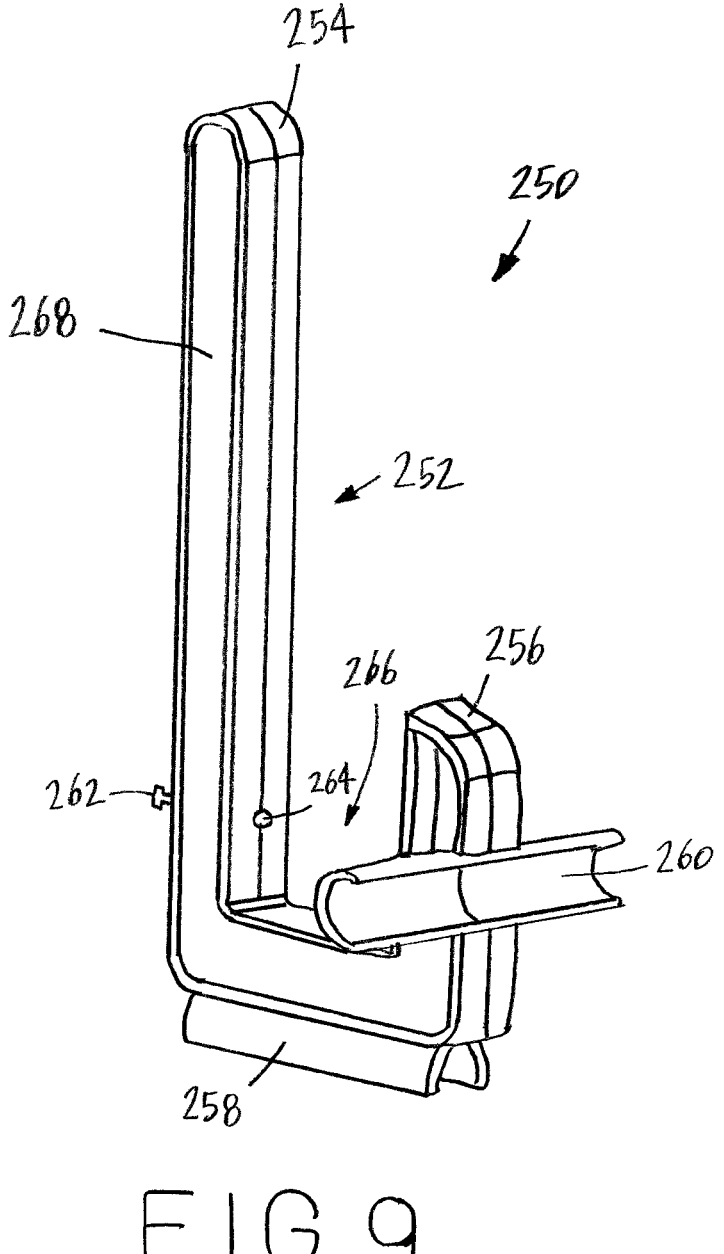
FIG. 9 is a perspective view of another embodiment of a hands free level constructed according to the present disclosure.

With particular reference now to FIG. 9, another embodiment of a hands free level 250 constructed according to the present disclosure is depicted. The hands free level 250 differs from the previously described hands free levels 10, 50, 100, and 200 in that the level 250 is used to level a stud (not shown) instead of a pipe. The hands free level 250 comprises a generally J-shaped body 252 having a first end 254 and a hook shaped end 256. The hook end 256 has a first or horizontal receptacle 258 and a second or vertical receptacle 260. The receptacles 258 and 260 are each adapted for receiving a bubble level (not shown) such as the level device 18 shown in FIG. 1. The body 252 also has a set screw 262 and a set screw opening 264 formed in the body 252 and extends through the body 252. The set screw 262 is inserted into the set screw opening 264 is capable of extending out of the body 252 to hold the device 250 to a stud. Unscrewing or loosening the set screw 262 will free the device 250 from the stud and allow the device 250 to be reposition along the stud. The device 250 also has a rectangular section 266 which is capable of fitting around a stud. The device 250 further has a grasping section 268. The grasping section 268 extends out from a stud and allows the device 250 to be easily grasped to move the device 250 along the stud or to remove the device 250 from the stud. As can be appreciated, the device 250 may be moved along a stud to check for level at various positions or locations along the stud. The hands free level 250 may be used on both a vertical stud and a horizontal stud or beam. The device 250 may be constructed of any suitable plastic or material. The device 250 may also being manufactured or constructed of a material that is resistant to mold and mildew or may be coated with a coating that is resistant to mold and mildew.

In operation, an individual may use any of the hands free levels 10, 50, 100, or 200 to level a pipe. For example, the levels 10, 50, 100, and 200 are sized and shaped to fit around a pipe. Once positioned on the pipe the bubble levels, such as the level device 18, is used to determine if level of the pipe has been accomplished. The individual may move or reposition the levels 10, 50, 100, or 200 along the pipe to check for level at various positions along the pipe. Once level has been determined the levels 10, 50, 100, or 200 may be removed from the pipe to check for level of another pipe. The hands free level 250 is sized and shaped to fit on a stud. Once positioned on the stud the bubble levels placed in the receptacles 258 and 260 may be used to determine level. The hands free level 250 may be moved or reposition along the stud to check for level at various points along the stud. Once level of the stud has been determined, the hands free level 250 may be removed from the stud to check for level of another stud.

Figure 10:
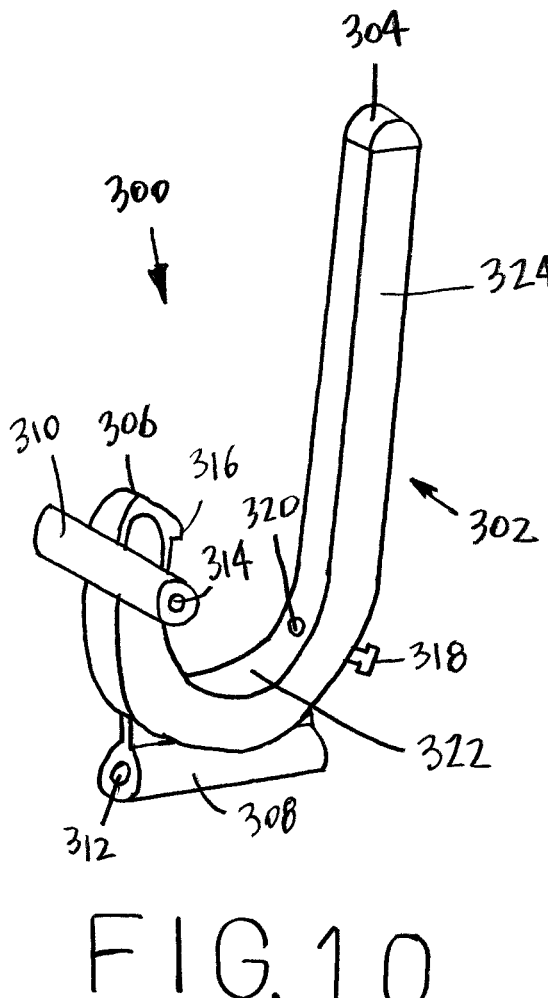
FIG. 10 is a perspective view of another embodiment of a hands free level constructed according to the present disclosure.

FIG. 10 shows another embodiment of a hands free level 300 constructed according to the present disclosure. The hands free level 300 comprises a generally J-shaped body 302 having a first end 304 and a hook shaped end 306. The hook end 306 has a first laser device 308 positioned in a horizontal orientation and a second laser device 310 positioned in a vertical orientation. The first laser device 308 has an opening 312 through which a laser beam (not shown) is projected. The second laser device 310 has an opening 314 through which a laser beam (not shown) is projected. As should be appreciated, the laser devices 308 and 310 have other openings at other ends for projecting laser beams. However, such openings are not shown in this particular view. The laser devices 308 and 310 may include LED (light emitting diode) type laser devices that may be battery operated. The beams projected from the laser devices 308 and 310 may be of any suitable color, such as red or green, that is perceivable or viewable during use of the device 300. Examples of the laser devices 308 and 310 are ones manufactured by Yiwu Zhangkun Electronic Commerce for lasers emitting red light and Dongguan Guangxin Electronic Co., Ltd. for lasers emitting green light. The hook end 306 has a hook or barb 316 that is used to engage a pipe (not shown) to hold the body 302 in a tension against the pipe. In this manner, the device 300 may be moved along the pipe to check for level at various positions along the pipe. As can be appreciated, the hands free level 300 may be employed on both a vertical pipe and a horizontal pipe. The device 300 may be constructed of any suitable plastic. The device 300 may also being manufactured or constructed of a material that is resistant to mold and mildew or may be coated with a coating that is resistant to mold and mildew. The body 302 also has a set screw 318 and a set screw opening 320 formed in the body 302 and extends through the body 302. The set screw 318 is inserted into the set screw opening 320 and is capable of extending out of the body 302 to hold the device

300 to a pipe. Unscrewing or loosening the set screw 318 will free the device 300 from the pipe and allow the device 300 to be reposition along the pipe. The device 300 also has a rounded section 322 which is capable of fitting around a pipe. The device 300 further has a grasping section 324. The grasping section 324 extends out from a pipe and allows the device 300 to be easily grasped to move the device 300 along the pipe or to remove the device 300 from the pipe. Although two laser devices 308 and 310 are depicted it is possible and contemplated to have one laser device or more than two laser devices. For example, it may only be required to level a vertical pipe and only the second laser device 310 will be included in the device 300. Further, the laser devices 308 and 310 could be placed in the receptacles 208 and 210 of the device 200 as shown in FIG. 8.

Figure 11:
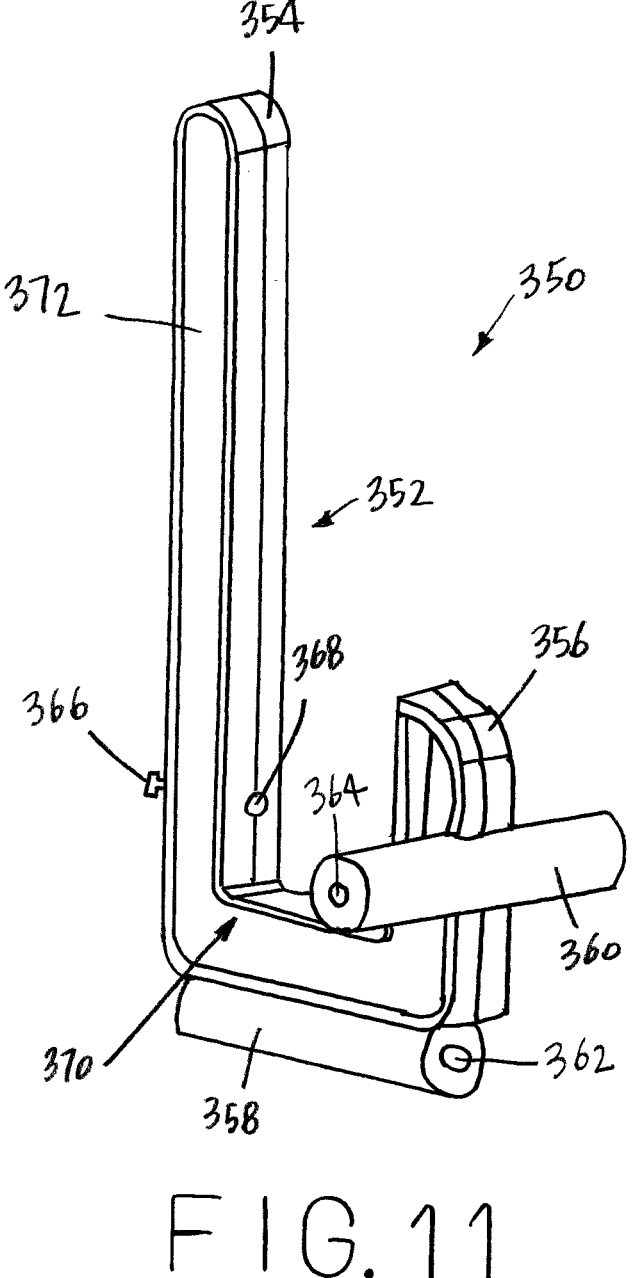
FIG. 11 is a perspective view of another embodiment of a hands free level constructed according to the present disclosure.

With particular reference now to FIG. 11, another embodiment of a hands free level 350 constructed according to the present disclosure is depicted. The hands free level 350 differs from the previously described hands free level 300 in that the level 350 is used to level a stud (not shown) instead of a pipe. The hands free level 350 comprises a generally J-shaped body 352 having a first end 354 and a hook shaped end 356. The hook end 356 has a first laser device 358 positioned in a horizontal orientation and a second laser device 360 positioned in a vertical orientation. The first laser device 358 has an opening 362 through which a laser beam (not shown) is projected. The second laser device 360 has an opening 364 through which a laser beam (not shown) is projected. As should be appreciated, the laser devices 358 and 360 have other openings at other ends for projecting laser beams. However, such openings are not shown in this particular view. The laser devices 358 and 360 may include LED (light emitting diode) type laser devices that may be battery operated. The beams projected from the laser devices 358 and 360 may be of any suitable color, such as red or green, that is perceivable or viewable during use of the device 350. Again, suitable examples of the laser devices 358 and 360 are ones manufactured by Yiwu Zhangkun Electronic Commerce for lasers emitting red light and Dongguan Guangxin Electronic Co., Ltd. for lasers emitting green light. The body 352 also has a set screw 366 and a set screw opening 368 formed in the body 352 and extends through the body 352. The set screw 366 is inserted into the set screw opening 368 is capable of extending out of the body 352 to hold the device 350 to a stud. Unscrewing or loosening the set screw 366 will free the device 350 from the stud and allow the device 350 to be reposition along the stud. The device 350 also has a rectangular section 370 which is capable of fitting around a stud. The device 350 further has a grasping section 372. The grasping section 372 extends out from a stud and allows the device 350 to be easily grasped to move the device 350 along the stud or to remove the device 350 from the stud. As can be appreciated, the device 350 may be moved along a stud to check for level at various positions or locations along the stud. The hands free level 350 may be used on both a vertical stud and a horizontal stud or beam. The device 350 may be constructed of any suitable plastic or material. The device 350 may also being manufactured or constructed of a material that is resistant to mold and mildew or may be coated with a coating that is resistant to mold and mildew. Although two laser devices 358 and 30 are depicted it is possible and contemplated to have one laser device or more than two laser devices. For example, it may only be required to level a vertical stud and only the second laser device 360 will be included in the device 350. Further, the laser devices 358 and 360 could be placed in the receptacles 258 and 260 of the device 250 as shown in FIG. 9.

From all that has been said, it will be clear that there has thus been shown and described herein a hands free level which fulfills the various objects and advantages sought therefor. It will be apparent to those skilled in the art, however, that many changes, modifications, variations, and other uses and applications of the subject hands free level are possible and contemplated. All changes, modifications, variations, and other uses and applications which do not depart from the spirit and scope of the disclosure are deemed to be covered by the disclosure, which is limited only by the claims which follow.

What is claimed is:

1. A hands free level comprising:

a body having a first end and a hook shaped end, the hook end having a first laser device positioned in a horizontal orientation and a second laser device positioned in a vertical orientation, the body having a set screw opening; and a set screw for insertion into the set screw opening.

2. The hands free level of claim 1 further comprising a rounded section which is capable of fitting around a pipe.

3. The hands free level of claim 1 further comprising a grasping section which extends out from a pipe and allows the hands free level to be easily grasped.

4. The hands free level of claim 1 further comprising a rectangular section which is capable of fitting around a stud.

5. The hands free level of claim 1 further comprising a grasping section which extends out from a stud and allows the hands free level to be easily grasped.

6. The hands free level of claim 1 wherein the body is manufactured of a material that is resistant to mold and mildew.

7. The hands free level of claim 1 wherein the body is constructed of plastic.

8. A hands free level comprising:

a generally J-shaped body having a first end and a hook shaped end, the hook shaped end having a first laser device positioned in a horizontal orientation and a second laser device positioned in a vertical orientation, the body having a set screw opening extending through the body; and a set screw for insertion into the set screw opening.

9. The hands free level of claim 8 further comprising a grasping section which extends out from a pipe and allows the hands free level to be easily grasped.

10. The hands free level of claim 8 wherein the hook shaped end is rounded and is capable of fitting around a pipe.

11. The hands free level of claim 8 wherein the hook shaped end is rectangular and is capable of fitting around a stud.

12. The hands free level of claim 8 wherein further comprising a grasping section which extends out from a stud and allows the hands free level to be easily grasped.

13. The hands free level of claim 8 wherein the body is manufactured of a material that is resistant to mold and mildew.

14. The hands free level of claim 8 wherein the body is constructed of plastic.

15. A hands free level comprising:

a body having a first end and a hook shaped end, the hook end having a laser device, the body having a set screw opening extending through the body; and a set screw for insertion into the set screw opening.

16. The hands free level of claim 15 further comprising a grasping section which extends out from a pipe and allows the hands free level to be easily grasped.

17. The hands free level of claim 15 wherein the hook shaped end is capable of fitting around a stud.

18. The hands free level of claim 15 wherein the body is constructed of plastic.

19. The hands free level of claim 15 further comprising a grasping section which extends out from a stud and allows the hands free level to be easily grasped.

20. The hands free level of claim 15 wherein the body is manufactured of a material that is resistant to mold and mildew.

* * * * *